United States Patent Office 2,733,223
Patented Jan. 31, 1956

2,733,223
BOOKBINDING MATERIAL COMPRISING A VINYL CHLORIDE POLYMER AND CASTOR OIL MALEATE

Howard A. Van Etten, Monroe, N. Y., assignor to E. I. du Pont de Nemours and Company, Wilmington, Del., a corporation of Delaware No Drawing. Application December 20, 1952,
Serial No. 327,168

9 Claims. (Cl. 260—23)

This invention relates to plasticized vinyl chloride polymer compositions, more particularly to fabrics coated with such compositions which are adapted for the binding of books and the process of making same.

Pyroxylin coated fabrics have been widely used for the binding of books and, while such products are generally satisfactory, improvement in certain properties is desired. In the decoration of pyroxylin coated fabric book covers by the lithographic process, in which the majority of the surface is covered by a printing ink of different color than the pyroxylin coating, consistently good coverage is not obtained.

Several unsuccessful attempts have been made to provide a coated fabric which can consistently be lithographed satisfactorily and still possess all the other required properties of a satisfactory book cover, such as, e. g. resistance to cracking at the fold line, cleanability, and receptivity to hydrophilic adhesives used to adhere the end sheet to the turned edges of the outside cover.

The industry in general has standardized on the printing inks employed for decorating book covers and expects all bookbinding materials, regardless of composition of the surface coating, to be compatible with the standard printing inks, which are generally based on drying-oil modified alkyd resins. It would be highly impractical if a different printing ink were necessary for each variation in the surface coating, such as different film formers, plasticizers, pigments and different proportions of such ingredients.

The primary object of this invention is the provision of an improved bookbinding material, lot after lot of which can be consistently lithographed with satisfactory coverage by using standard drying-oil modified alkyd resin printing inks.

After evaluating a great number of combinations of various film formers and plasticizers, I have found that the combination of certain vinyl resins and castor oil maleate produces a coating for a fabric base which can be consistently lithographed satisfactorily and still possesses all the other required properties of a satisfactory bookbinding material.

The following specific examples will serve to illustrate the invention. In the formulae the percentage figures are expressed on a weight basis unless otherwise specified. The numbers in the parentheses represent the percentages based on the non-volatile components of the composition.

Example I

A cotton sheeting fabric running 3.35 yards per pound per 43" width was coated on one side with two coats of the following composition:

| | Percent | |
|---|---|---|
| Copolymer of about 85 parts of vinyl chloride and 15 parts vinyl acetate | 8.55 | (17.62) |
| Copolymer of about 95 parts of vinyl chloride and 5 parts of vinylidene chloride | 8.55 | (17.62) |
| Castor oil maleate | 9.28 | (19.12) |
| Titanium dioxide pigment | 22.14 | (45.64) |
| Methyl ethyl ketone | 51.48 | |
| | 100.00 | (100.00) |

The above composition was prepared by separately grinding the pigment in the castor oil maleate and dissolving the resin in the methyl ethyl ketone, after which the pigment grind and resin solution were blended.

The above composition was applied by means of a doctor knife and passed through a heat zone after each coat to evaporate the volatile solvent. Sufficient coating was applied to deposit about 2.0 ounces of dry coating per square yard. To provide a smooth surface for subsequent printing the coated fabric was passed between heated smooth pressure rolls after each coat of the above described composition.

The coated fabric was tested for bookbinding properties at this stage with the following results:

| | |
|---|---|
| Schiltknecht flex—flexes before cracking | 17,500. |
| End sheet adhesion—sized turn-ins | O. K. |
| Furniture finish mar—oven 150° F.: | |
|    1 month | None. |
|    4 months | None. |
| Sticking to pyroxylin coated fabric (coating to coating): | |
|    1 month—150° F. oven | None. |
|    2 months—room temperature | None. |
| Ink printing—anchorage: | |
|    Initial | Good. |
|    After 1 month aging in 150° F. oven | No change. |
| Gold stamping—anchorage: | |
|    Initial | Good. |
|    After 1 month aging in 150° F. oven | No change. |
| Blanking | Good. |

The apparatus employed for the Schiltknecht flex test is described in Bulletin No. 105 of Alfred Sutter, 200 Fifth Avenue, New York, N. Y.

The "furniture finish mar" test was run by placing a two inch square sample of the coated fabric on a highly polished furniture finish under a one pound weight, with the coated side in contact with the furniture finish.

The "sticking to pyroxylin coated fabric" test was carried out in a like manner, except that a pyroxylin coated fabric was substituted for the furniture finish.

The "ink printing" and "gold stamping" tests were carried out by standard bindery procedure.

"Blanking" is a term used in the bookbinding industry to describe an operation which flattens a small area of an already embossed surface to provide a smooth area for printing.

The smooth-surfaced material is supplied to the book manufacturer in roll form. He cuts it to size and prints the coated surface by the lithographic process. The entire cover, except the portion forming the desired design, may be completely overprinted with a conventional drying-oil modified alkyd resin printing ink (such as disclosed in U. S. Patent 2,049,507) of a color different from the fabric coating. Alternatively, various areas may be printed with a variation in depth of color, from no color to the masstone, to form the design. The printed cover is next adhered to paper binder boards with the edges turned over and adhered to the opposite side of the binder board. The paper end sheets are next adhered to the turned edges and binder boards. When the turned edges have a heavy vinyl coating, the adhesion of the end sheets thereto can be improved by first applying a size (such as that disclosed in U. S. Patent 2,483,465) to the turned edges.

Several different lots of bookbinding material, produced as described above, were lithographed satisfactorily in the desired areas with a drying-oil modified alkyd resin ink pigmented to a bright blue color, such as that disclosed as Example 1 in U. S. Patent 2,049,507. There were no rejects, whereas, about 20% of an equal number of different lots of conventional pyroxylin coated fabric were rejected for unsatisfactory coverage with the same printing ink.

Equally good results were obtained when the following coating compositions were employed in place of that described above.

Example II

| | Percent | |
|---|---|---|
| Copolymer of about 88 parts of vinyl chloride and 12 parts of vinylidene chloride | 17.80 | (34.92) |
| Castor oil maleate | 9.46 | (18.56) |
| Titanium dioxide pigment | 23.67 | (46.52) |
| Methyl ethyl ketone | 49.07 | ------ |
| | 100.00 | (100.00) |

Example III

| | Percent | |
|---|---|---|
| Polyvinyl chloride (homopolymer) | 17.80 | (34.92) |
| Castor oil maleate | 9.46 | (18.56) |
| Titanium dioxide pigment | 23.67 | (46.52) |
| Methyl ethyl ketone | 49.07 | ------ |
| | 100.00 | (100.00) |

Example IV

| | Percent | |
|---|---|---|
| Copolymer of about 88 parts of vinyl chloride and 12 parts of vinylidene chloride | 17.7 | (34.4) |
| Titanium dioxide pigment | 12.0 | (23.4) |
| Barytes | 12.0 | (23.4) |
| Castor oil maleate | 9.6 | (18.8) |
| Methyl ethyl ketone | 48.7 | ------ |
| | 100.0 | (100.0) |

Unpigmented plasticized films were prepared with the resins employed in Examples I, II and III, as well as with the copolymer of 85 parts of vinyl chloride with 15 parts of vinyl acetate, together with castor oil maleate in the same ratio as used in the examples, i. e., 65/35. The following results were obtained:

| Resin 65 parts | Plasticizer 35 parts | Clarity of Film |
|---|---|---|
| Example I Resin Blend | Castor Oil Maleate | Slightly Cloudy. |
| Example II Resin | do | Clear. |
| Example III Resin | do | Do. |
| Copolymer of 85 parts of vinyl chloride and 15 parts of vinyl acetate. | do | Very Cloudy. |

The films were prepared by casting a methyl ethyl ketone solution of each resin with the castor oil maleate on a glass plate and allowing the solvent to evaporate.

The film prepared from 65 parts of Example I resin blend with 35 parts of castor oil maleate indicated a certain degree of incompatibility, but not sufficient to detract from the usefulness of the Example I coating composition in the manufacture of bookbinding material as described. In Examples II, III and IV, which do not employ vinyl acetate containing resins, there was no incompatibility.

The non-pigmented films described above indicate that the vinyl acetate component of the resins is responsible for the incompatibility, although, as shown by Example I, vinyl acetate can be tolerated as a minor part of a copolymer resin. In Example I the vinyl acetate component of the copolymers represent 7.5% based on the total resin weight. The maximum amount of vinyl acetate component of the resin which can be tolerated is 20% of the total resin weight.

Where it is desired that the fabric base (colored or uncolored) show through the coating, the pigment in the coating may be eliminated entirely. For the purpose of economy, where film strength is not too important, compositions containing as much as 50% pigment and/or filler based on the total weight of non-volatile components of the composition may be used. White pigments other than titanium dioxide, shown in the example, may be used, such as, e. g., zinc oxide, lithopone and antimony oxide. Also, where it is desired, the fabric base may be coated with a composition containing various colored pigments and the printing ink containing white pigments. Alternately, the fabric base may be coated with a colored composition and the printing ink may be of a contrasting color.

The ratio of total resin to castor oil maleate may vary between 40-80 parts of resin and 60-20 parts of castor oil maleate.

There are no particular limits as to the amount of coating to be applied to the fabric base. It may vary from lightly impregnated fabrics to fully coated fabrics.

In place of the woven cotton fabrics employed in the examples, other flexible substrates may be employed, such as, e. g., non-woven fiber webs, paper, metal foil, and various textile fabrics made from synthetic yarns. The compositions of this invention may also be used for coating rigid surfaces which are to be printed, such as, e. g., wood and metal.

As noted above, the book cover is generally cut to size before being lithographed. It is also possible to print the design on the coated cloth while it is in roll form.

The preferred embodiment of this invention involves a coated fabric adapted for use as the outer cover of binder boards employed in binding books, or any other use which requires printing on the outer surface with drying-oil modified alkyd resin printing inks. The compositions employed for fabric coatings may be dissolved in hot methyl ethyl ketone, or other suitable solvents, and then applied to the base fabric by means of a doctor knife. Alternately, the resin may be pre-colloided in the plasticizer mixture by working on a two-roll rubber mill, or a Banbury mixer, in the absence of volatile solvents and, while hot, calendered onto a fabric base. Where a fabric base is not essential, as in the case of covers for looseleaf notebooks, the hot pre-colloided plastic mass may be sheeted in the form of an unsupported film by passing between heated calendar rolls.

While the invention has been described with reference to bookbinding material, it will be understood by those skilled in the art of coated fabrics and unsupported films that the products of this invention are readily adaptable for other uses which require the surface to be printed with drying-oil type inks.

In the claims the term "a vinyl chloride polymer resin" is used to denote the homopolymer of vinyl chloride and copolymers of vinyl chloride with vinylidene chloride or vinyl acetate; the vinyl acetate representing not more than 20% by weight of the copolymer resin.

It is apparent that many widely different embodiments of this invention may be made without departing from the spirit and scope thereof; and, therefore, it is not intended to be limited except as indicated in the appended claims.

I claim:

1. A bookbinding material particularly adapted for printing, comprising a film of a mixture of castor oil maleate and a vinyl resin selected from the group consisting of homopolymer of vinyl chloride, copolymer of vinyl chloride and vinylidene chloride, copolymer of vinyl chloride and vinyl acetate, and mixtures thereof, the vinyl chloride content of said copolymers being at least 80% by weight, and the ratio, on a weight basis, of resin to castor oil maleate being between 40:60 and 80:20.

2. A bookbinding material particularly adapted for printing, comprising a fabric base coated with a composition comprising a mixture of castor oil maleate and a vinyl resin selected from the group consisting of homopolymer of vinyl chloride, copolymer of vinyl chloride and vinylidene chloride, copolymer of vinyl chloride and vinyl acetate, and mixtures thereof, the vinyl chloride content of said copolymers being at least 80% by weight, and the ratio, on a weight basis, of resin to castor oil maleate being between 40:60 and 80:20.

3. A bookbinding material particularly adapted for printing, comprising a fabric base having a coating thereon comprising a mixture of castor oil maleate, pigment, and a vinyl resin selected from the class consisting of homopolymer of vinyl chloride, copolymer of vinyl chloride and vinylidene chloride, copolymer of vinyl chloride and vinyl acetate, and mixtures thereof, the vinyl chloride content of said copolymers being at least 80% by weight, and the ratio, on a weight basis, of resin to castor oil maleate being between 40:60 and 80:20.

4. A bookbinding material to which drying-oil modified alkyd resin printing inks will firmly anchor, comprising a fabric base with an adherent coating of the following approximate composition:

| | Percent by weight |
|---|---|
| Copolymer of 85 parts vinyl chloride and 15 parts vinyl acetate | 17.62 |
| Copolymer of 95 parts vinyl chloride and 5 parts vinylidene chloride | 17.62 |
| Castor oil maleate | 19.12 |
| Pigment | 45.64 |
| | 100.00 |

5. The product of claim 1 in which the vinyl chloride polymer resin is a homopolymer of polyvinyl chloride.

6. The product of claim 1 in which the vinyl chloride polymer resin is a copolymer of about 85 parts of vinyl chloride and 15 parts of vinyl acetate.

7. The product of claim 1 in which the vinyl chloride polymer is a copolymer of about 88 parts of vinyl chloride and 12 parts of vinylidene chloride.

8. The product of claim 1 in which the vinyl chloride polymer is a blend of (1) a copolymer of about 85 parts of vinyl chloride and 15 parts vinyl acetate and (2) a copolymer of about 88 parts of vinyl chloride and 12 parts of vinylidene chloride.

9. Process of preparing a coated fabric adapted for printing with drying-oil modified alkyd resin printing inks, which comprises applying to one side of a fabric base a coating composition comprising a mixture of 40–80 parts by weight of resin selected from the class consisting of homopolymer of vinyl chloride, copolymer of vinyl chloride and vinylidene chloride, copolymer of vinyl chloride and vinyl acetate, and mixtures thereof, 60–20 parts by weight of castor oil maleate and a volatile solvent, and heating to volatilize the solvent, the vinyl chloride content of said resin being at least 80% of the weight of the resin.

References Cited in the file of this patent
UNITED STATES PATENTS 2,583,150    Minter et al. _____ Jan. 22, 1952